(12) United States Patent
Smith et al.

(10) Patent No.: US 10,089,875 B2
(45) Date of Patent: Oct. 2, 2018

(54) AUTOMATED VEHICLE CROSS-TRAFFIC DETECTION SYSTEM

(71) Applicant: Delphi Technologies, Inc., Troy, MI (US)

(72) Inventors: Matthew R. Smith, Springboro, OH (US); Walter K. Kosiak, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 170 days.

(21) Appl. No.: 15/256,784

(22) Filed: Sep. 6, 2016

(65) Prior Publication Data
US 2018/0068565 A1 Mar. 8, 2018

(51) Int. Cl.
| G08G 1/16 | (2006.01) |
| G05D 1/00 | (2006.01) |
| G08G 1/01 | (2006.01) |
| B60W 30/08 | (2012.01) |

(52) U.S. Cl.
CPC ............ *G08G 1/161* (2013.01); *B60W 30/08* (2013.01); *G05D 1/0088* (2013.01); *G08G 1/0112* (2013.01); *G08G 1/0125* (2013.01); *G08G 1/0129* (2013.01); *G08G 1/166* (2013.01)

(58) Field of Classification Search
CPC ...... G08G 1/161–1/168; G08G 1/0112; G08G 1/0125; G08G 1/0129; G08G 1/0133; B60W 30/095–30/0956; B60W 30/08; B60W 30/085; B60W 30/09; G05D 1/0088

See application file for complete search history.

(56) References Cited

U.S. PATENT DOCUMENTS

| 2013/0253815 A1 | 9/2013 | Orfila et al. |
| 2016/0140847 A1 | 5/2016 | Kawamata et al. |

FOREIGN PATENT DOCUMENTS

EP          2 835 794 A1      2/2015

*Primary Examiner* — Adam R Mott
(74) *Attorney, Agent, or Firm* — Lawrence D. Hazelton

(57) ABSTRACT

A cross-traffic detection system suitable for use on an automated vehicle includes an object-detector and a controller. The object-detector is used to determine locations of a moving-object relative to a host-vehicle. Each of the locations is indicated by a lateral-distance and a longitudinal-distance of the moving-object from the host-vehicle. The controller is in communication with the object-detector. The controller is configured to accumulate a plurality of first-longitudinal-distances of a first-vehicle at a plurality of predetermined-lateral-distances, and determine a path-history of the first-vehicle based on linear-interpolation between successive instances of the plurality of first-longitudinal-distances at corresponding instances of the plurality of predetermined-lateral-distances. The controller is also configured to determine that a second-vehicle is following the path-history of the first-vehicle when the second-vehicle passes within an offset-distance to the path-history that is less than an offset-threshold, and estimate a crossing-distance from the host-vehicle based on the path-history and the offset-distance.

4 Claims, 3 Drawing Sheets

AUTOMATED VEHICLE CROSS-TRAFFIC DETECTION SYSTEM

TECHNICAL FIELD OF INVENTION

This disclosure generally relates to a cross-traffic detection system suitable for use on an automated vehicle, and more particularly relates to a system that determines a path-history of the first-vehicle based on linear-interpolation between successive detected locations, determines that a second-vehicle is following the path-history of the first-vehicle when the second-vehicle passes within an offset-distance to the path-history that is less than an offset-threshold, and estimates a crossing-distance from the host-vehicle based on the path-history and the offset-distance.

BACKGROUND OF INVENTION

Cross-traffic alert systems that notify an operator when an approaching vehicle is predicted to pass behind the host-vehicle are known. The prediction can be difficult when, for example, initial heading estimates might be erroneous, and/or the road may be curved. It has been observed that vehicles that are headed for the alert region may appear to be headed away until the last moment, leading to late alerts. It has been proposed to fit trajectories of approaching vehicles with a polynomial or other curved least-squares model. However, this solution may excessively tax the available computing resources and require large amounts of memory to store data and solutions more than a small number of past trajectories.

SUMMARY OF THE INVENTION

In accordance with one embodiment, a cross-traffic detection system suitable for use on an automated vehicle is provided. The system includes an object-detector and a controller. The object-detector is used to determine locations of a moving-object relative to a host-vehicle. Each of the locations is indicated by a lateral-distance and a longitudinal-distance of the moving-object from the host-vehicle. The controller is in communication with the object-detector. The controller is configured to accumulate a plurality of first-longitudinal-distances of a first-vehicle at a plurality of predetermined-lateral-distances, and determine a path-history of the first-vehicle based on linear-interpolation between successive instances of the plurality of first-longitudinal-distances at corresponding instances of the plurality of predetermined-lateral-distances. The controller is also configured to determine that a second-vehicle is following the path-history of the first-vehicle when the second-vehicle passes within an offset-distance to the path-history that is less than an offset-threshold, and estimate a crossing-distance from the host-vehicle based on the path-history and the offset-distance.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
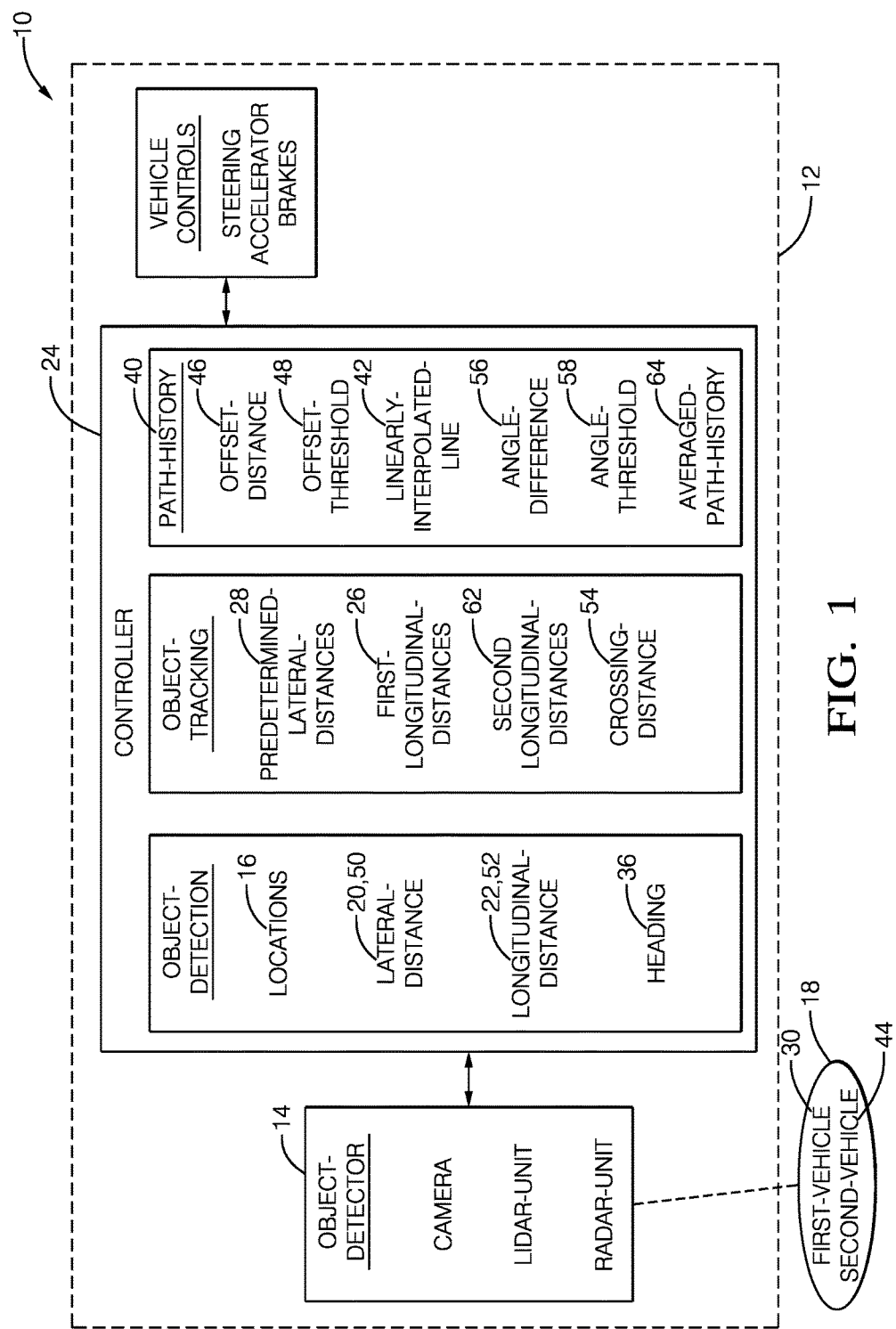
FIG. 1 is diagram of a cross-traffic detection system in accordance with one embodiment.

FIG. 1 illustrates a non-limiting example of a cross-traffic detection system 10, hereafter referred to as the system 10, which is suitable for use on an automated vehicle, for example a host-vehicle 12. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human-operator (not shown) and the automation is merely providing a cross-traffic alert to the human-operator, and possibly operating the brakes of the host-vehicle 12 to prevent the host-vehicle 12 from entering a travel-path of an approaching vehicle.

As used herein, the term 'cross-traffic' is generally used to refer to instances where the host-vehicle 12 is attempting to enter a roadway, but the presence of cross-traffic present on the roadway requires the host-vehicle 12 to wait until the cross-traffic passes so the roadway can be safely entered. Known cross-traffic alert systems are often associated with situations when a vehicle is attempting to back out of a driveway onto a roadway, but it is contemplated that the system 10 described herein will also be useful when the host-vehicle 12 is traveling in a forward direction. As will be recognized by those in the art, a cross-traffic alert system is particularly useful when the human-operator's view of a roadway is blocked by, for example, shrubs, bushes, or other landscape features.

The system 10 includes an object-detector 14 used to determine the locations 16 of a moving-object 18 that is moving proximate to and/or relative to the host-vehicle 12. While the non-limiting examples presented herein are generally directed to instances when the moving object 18 is another vehicle (e.g. another automobile) approaching the host-vehicle 12, it is contemplated that the moving-object 18 may be, for example, a pedestrian who is walking, skateboarding, or bicycling and moving relative to the host-vehicle 12. By way of example and not limitation, the object-detector 14 may be a camera, lidar-unit, a radar-unit, or any type of detector useable to detect the presence and relative location of the moving-object 18. Devices with inherent ranging capabilities such as the radar-unit or lidar-unit are considered to be preferable choices as those devices are particularly useful to determine a range and direction from the host-vehicle 12 to the locations 16 of an instance of the moving-object 18.

As will become apparent in the description that follows, it will be advantageous if the locations 16 are indicated or represented in Cartesian-coordinates by a lateral-distance 20 (i.e. distance measured leftward/rightward relative to the host-vehicle 12) and a longitudinal-distance 22 (i.e. distance measured forward/backward relative to the host-vehicle 12) of the moving-object 18 from or relative to the host-vehicle 12. Typically, a radar-unit or a lidar-unit will provide data in polar-coordinates (e.g. direction and range to a target) so some processing to convert or translate polar-coordinates into Cartesian-coordinates, the process for doing so being well-known to those in the art.

Accordingly, the system 10 includes a controller 24 in communication with the object-detector 14 that may be configured or programmed to convert the polar-coordinate data typically provided from a radar-unit or lidar-unit into Cartesian-coordinates. The controller 24 may include a processor (not specifically shown) such as a microprocessor or other control circuitry such as analog and/or digital control circuitry including an application specific integrated circuit (ASIC) for processing data as should be evident to those in the art. The controller 24 may include memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the moving-object 18 is going to cross the intended path of the host-vehicle 12 (i.e. the moving-object 18 is or is predicted to become an instance of cross-traffic) based on signals received by the controller 24 from the object-detector 14 as described herein.

In order for the system 10 to determine if the moving-object 18 is or will become an instance of cross-traffic (i.e. pass close to the host-vehicle 12), the controller 24 may be configured to accumulate (i.e. record and store) a plurality of first-longitudinal-distances 26 of a first-vehicle 30 at a plurality of predetermined-lateral-distances 28. That is, as an instance of the moving-object 18 moves toward (or away from) the host-vehicle 12, the longitudinal-distance 22 (how far forward or rearward the moving-object 18 is relative to a zero-line 34 perpendicular to a longitudinal-axis 32 of the host-vehicle 12, see FIGS. 2 and 3) is accumulated (i.e. recorded and stored) at previously determined values of the lateral-distance 20. It is contemplated that an alternative could be to accumulate data at some selected time-interval. However, using the predetermined-lateral-distances 28 is preferred as the memory size necessary to store the maximum number of data points can be planned for, and subsequent mathematical operations described herein are simplified. It is also contemplated that the lateral-distance 20 and the longitudinal-distance 22 at the instant the first-vehicle 30 is first detected (i.e. the first-detection of the first-vehicle 30), and the instant that the first-vehicle 30 is last detected (i.e. the last-detection of the first-vehicle 30) may also be accumulated along with the locations 16 for each of the predetermined-lateral-distances 28.

It is recognized that the sampling-rate of the object-detector 14 will need to be sufficient to provide the lateral-distance 20 and the longitudinal-distance 22 of the moving-object 18 at instances close to each instance of the predetermined-lateral-distances 28. For example, if one meter (1 m) resolution is desired for an instance of the moving-object traveling at one-hundred kilometers-per-hour (100 kph), then a sample-rate of at least twenty-eight Hertz (28 Hz) is required. It is contemplated that a heading 36 of the moving-object 18 may be used to extrapolate or adjust the value of the longitudinal-distance 22 so that is corresponds to a value that would be expected if the data had been captured when the lateral-distance 20 was exactly equal to an instance of the predetermined-lateral-distances 28.

Figure 2:
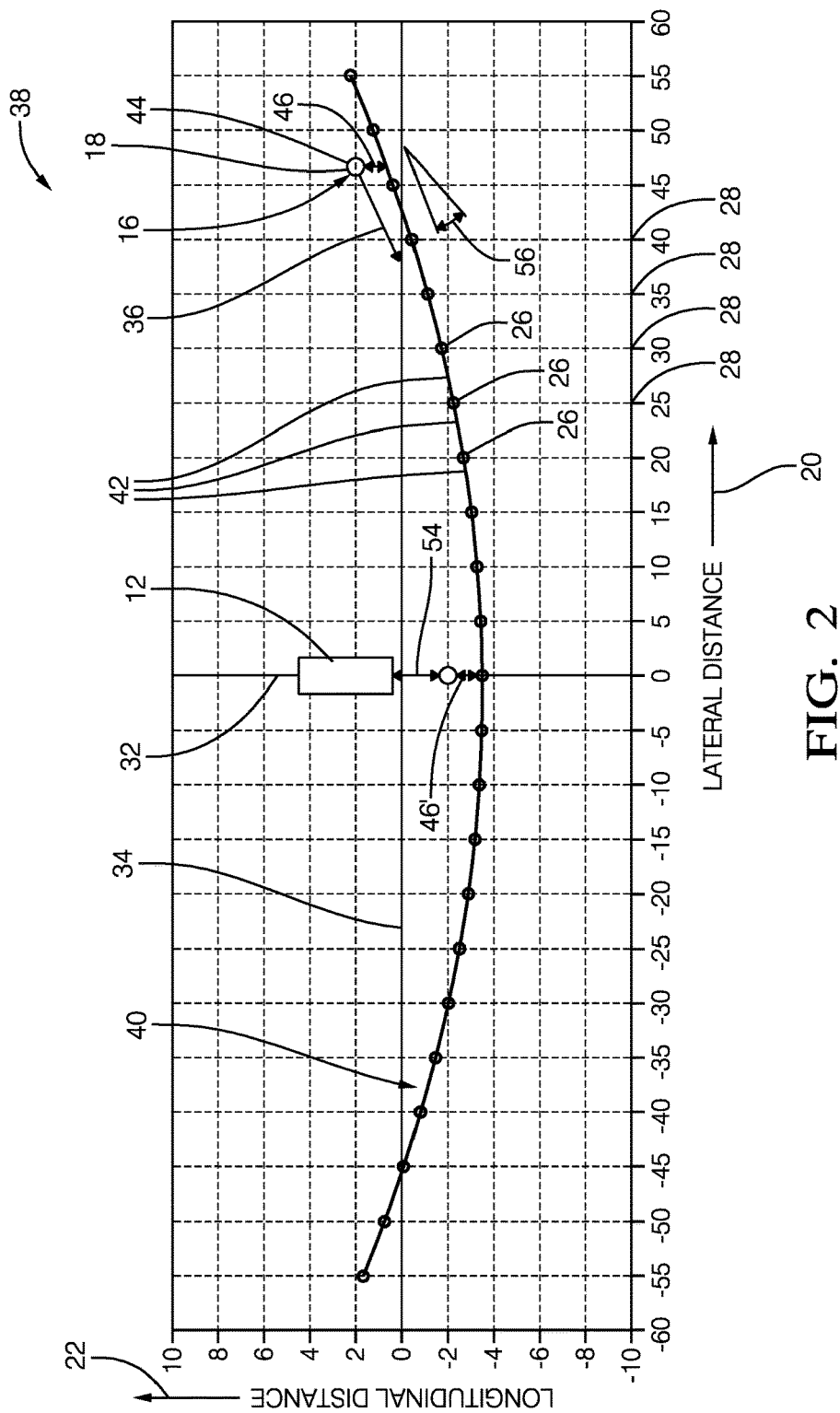
FIG. 2 is graph of data used by the system of FIG. 1 in accordance with one embodiment.

FIG. 2 illustrates a non-limiting example of a graph 38 of a path-history 40 of the first-vehicle 30 based on a linear-interpolation (i.e. a first-order interpolation or straight-line fit) between successive (i.e. adjacent or subsequent) instances of the plurality of first-longitudinal-distances 26 at corresponding instances of the plurality of predetermined-lateral-distances 28. In this non-limiting example, the predetermined-lateral-distances 28 were selected to be located every five meters (5 m) from minus-sixty meters (−60 m) to plus-sixty meters (+60 m) measured relative to the longitudinal-axis 32. Using the predetermined-lateral-distances 28 instead of recording and storing every data point or every 'n-th' data point provided by the object-detector 14 reduces and makes predictable the amount of memory required to store the locations 16 from multiple vehicles.

The use of linear-interpolation between successive data points to form or determine the path-history 40 by the system 10 described herein stands in contrast to prior examples of cross-traffic alert systems that attempt to model the travel-path of a vehicle with second-order or higher-order polynomials, or other complicated formulas that have curvature. The first-order piece-wise form of the path-history 40 described herein allows for instances when the path-history 40 has a shape that has third-order or higher-order characteristics, without resorting to computationally complex formulas. Each adjacent pair of the locations 16 characterized by the corresponding pair of the lateral-distance 20 and the longitudinal-distance 22 is used to determine an instance of a linearly-interpolated-line 42 to complete the first-order piece-wise model of the path-history 40.

Once the path-history 40 is determined, the system 10, or more specifically the controller 24, is able to determine when a second-vehicle 44 is following the path-history 40 of the first-vehicle 30 (which may be long-gone, i.e. not presently detected by the object-detector 14) when the second-vehicle 44 passes an offset-distance 46 to the path-history 40 that is less than an offset-threshold 48, fifteen meters (15 m) for example. As used herein, the phrase "following the path-history 40" does not require that the second-vehicle travel precisely along the path-history 40. For example, the path-history 40 may be curved because the roadway traveled by the first-vehicle 30 is curved. However, the roadway may have multiple lanes and/or the second-vehicle 44 may be traveling in the opposite direction as the first-vehicle 30, so the travel-path of the second-vehicle 44 may be offset from but generally parallel to the path-history 40. The location 16 of the second-vehicle 44 may be indicated by a second-longitudinal-distance 52 and a second-lateral-distance 50 when the second-vehicle 44 is initially detected. Alternatively, the second-vehicle 44 may be tracked until some confidence-level is achieved that indicates what is being tracked is indeed a vehicle, and then the first time the second-vehicle 44 crosses one of the predetermined-lateral-distances 28, the second-lateral-distance 50 and the second-longitudinal-distance 52 will be accumulated.

Based on the second-lateral-distance 50 and the second-longitudinal-distance 52, the offset-distance 46 is measured relative to the path-history 40. If the second-lateral-distance 50 corresponds to (i.e. is aligned with or is substantially equal to) an instance of the predetermined-lateral-distances 28, then the offset-distances 46 may be calculated based on the difference between the longitudinal-distance 22 of the path-history 40 and the second-longitudinal-distance 52 at that instance of the predetermined-lateral-distances 28. However, if the second-lateral-distance 50 is substantially between two instances of the predetermined-lateral-distances 28, then the offset-distance 46 may be measured relative to the linearly-interpolated-line 42 between two instances of the predetermined-lateral-distances 28 characterized as closest to the location 16 indicated by the second-longitudinal-distance 52 and the second-lateral-distance 50.

After the offset-distance 46 is determined, the controller 24 may estimate a crossing-distance 54 from the host-vehicle 12 that the second-vehicle 44 will pass, in this example, behind the host-vehicle 12. The crossing-distance 54 is estimated based on the path-history 40 and the offset-distance 46. By way of example, FIG. 2 shows that the offset-distance 46 is a positive value, so the estimate is based on the presumption that the offset-distance 46 will be maintained until the second-vehicle 44 crosses the longitudinal-axis 32 of the host-vehicle 12. That is, the offset-distance 46 is used as a projected-offset 46' to estimate where the second-vehicle 44 will be relative to the path-history 40 when the second-vehicle 44 crosses the longitudinal-axis 32 of the host-vehicle 12. It is contemplated that the offset-distance 46 will be periodically recalculated as the second-vehicle 44 approaches the host-vehicle 12 so measurement errors due to long distance detection by the object-detector 14 can be reduced, whereby the most reliable value of the crossing-distance 54 can be estimated.

As suggested above, one way to determine that the second-vehicle 44 is following the path-history 40 is based on the offset-distance 46. Alternatively, or in combination with that practice, the controller 24 may be configured to use the heading 36 of the second-vehicle 44 to determine an angle-difference 56 of the heading 36 is measured relative to the linearly-interpolated-line 42 between two instances of the first-longitudinal-distances 26 and the predetermined-lateral-distances 28 characterized as closest to the second-longitudinal-distance 52 and the second-lateral-distance 50 at the location 16 of the second-vehicle 44. The second-vehicle may then be characterized as not following the path-history 40 when the angle-difference 56 is greater than an angle-threshold 58, plus or minus thirty-five degrees (+/−35°) for example. That is, if the heading 36 of the second-vehicle 44 is too different from the effective heading of the path-history 40 at a point proximate to the location 16 of the second-vehicle 44, i.e. the angle-difference 56 is greater than the angle-threshold 58, then that may be an indication that the second-vehicle 44 is turning off the roadway or not even traveling the roadway traveled by the first-vehicle 30 to establish the path-history 40.

Figure 3:
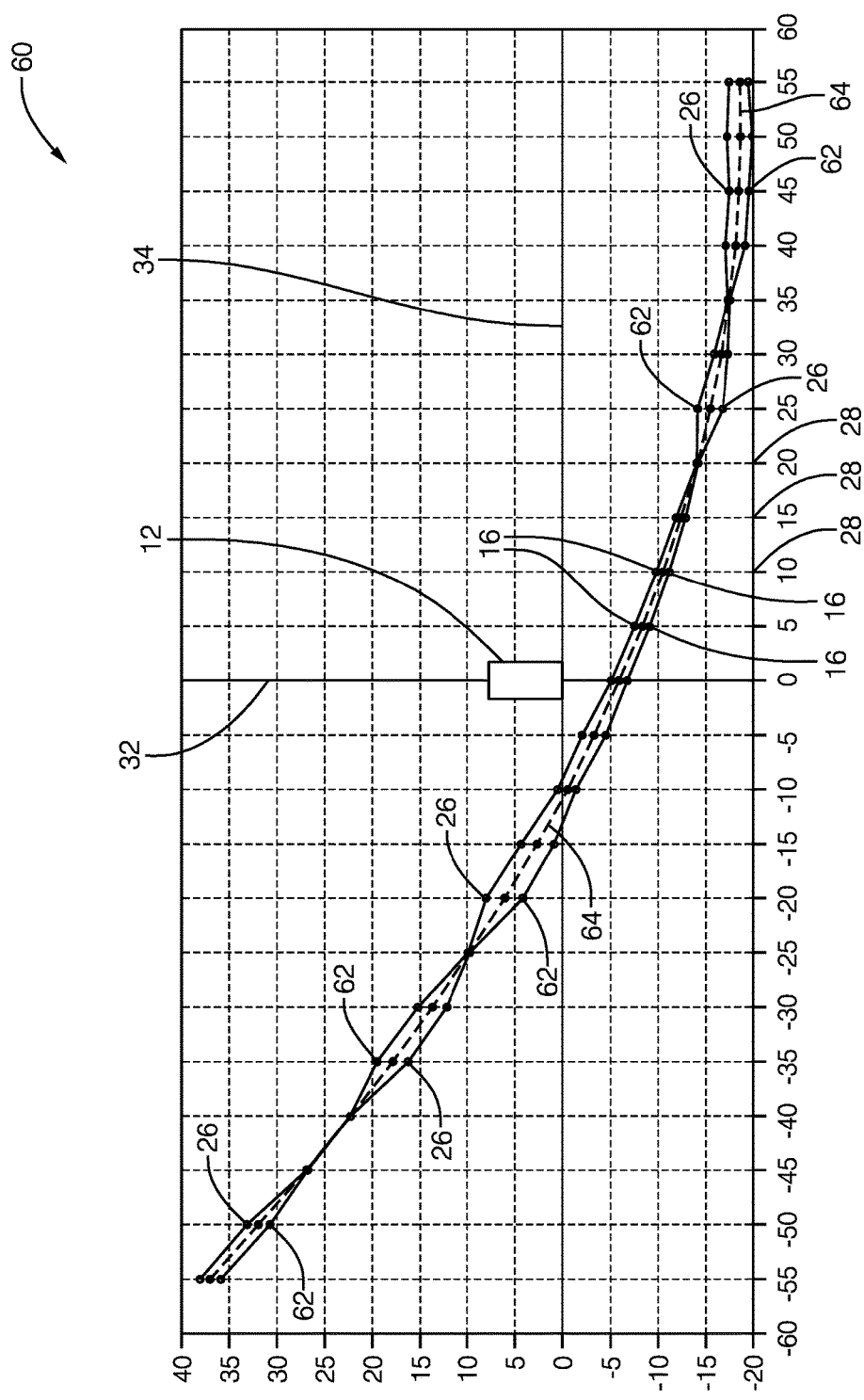
FIG. 3 is another-graph of data used by the system of FIG. 1 in accordance with one embodiment.

FIG. 3 illustrates a non-limiting example of another-graph 60 showing the result of the controller 24 being further configured to accumulate a plurality of second-longitudinal-distances 62 of the second-vehicle 44 at the plurality of predetermined-lateral-distances 28, and determine an averaged-path-history 64 based on the plurality of first-longitudinal-distances 26 and the plurality of second-longitudinal-distances 62 at corresponding instances of the plurality of predetermined-lateral-distances 28. In more general terms, multiple path-histories of multiple vehicles are averaged to determine the averaged-path-history 64, with the goal of more accurately or reliably defining the shape of the roadway traveled by the multiple vehicles. In this example the variations of the locations 16 represented by the first-longitudinal-distances 26 and the second-longitudinal-distances 62 might suggest that the roadway does not have well defined lane-markings so the vehicles appear to weave about the average-path-history. An alternative scenario is that there are well defined lane markings so the paths of the first-vehicle 30 and the second-vehicle 44 may not cross and may be consistently offset from each other because, for example, they are traveling in opposite directions on opposite sides of a center-line lane-marking. In this scenario, the averaged-path-history 64 would likely correspond to or be aligned with the center-line lane-marking.

Accordingly, a cross-traffic detection system (the system 10), a controller 24 for the system 10, and a method of operating the system 10 is provided. The use of linear-interpolation to define a path-history 40 and provide a linearly-interpolated-line 42 provides for a simple method by which an offset-distance 46 and/or an angle-difference 56 can be determined. The offset-distance 46 also provides for a simple method by which the crossing-distance 54 can be easily estimated determined so that if the second-vehicle 44 is going to pass too close to or collide with the host-vehicle 12, the system 10 can take appropriate action. The appropriate action may include issuing a cross-traffic warning (audible and/or visible) detectable by the human-operator, or automatically applying the brakes of the host-vehicle 12, or even autonomously operating the vehicle controls of the host-vehicle 12 to move the host-vehicle 12 in a manner effective to increase the estimated or predicted value of the crossing-distance 54.

While this invention has been described in terms of the preferred embodiments thereof, it is not intended to be so limited, but rather only to the extent set forth in the claims that follow.

We claim:

1. A cross-traffic detection system suitable for use on an automated vehicle, said system comprising:
   an object-detector used to determine locations of a moving-object relative to a host-vehicle, each of said locations indicated by a lateral-distance and a longitudinal-distance of the moving-object from the host-vehicle;
   a controller in communication with the object-detector, said controller configured to accumulate a plurality of first-longitudinal-distances of a first-vehicle at a plurality of predetermined-lateral-distances, determine a path-history of the first-vehicle based on linear-interpolation between successive instances of the plurality of first-longitudinal-distances at corresponding instances of the plurality of predetermined-lateral-distances, determine that a second-vehicle is following the path-history of the first-vehicle when the second-vehicle passes within an offset-distance to the path-history that is less than an offset-threshold, estimate a crossing-distance from the host-vehicle based on the path-history and the offset-distance, and operate the host-vehicle in accordance with the crossing-distance.

2. The system in accordance with claim 1, wherein a location of the second-vehicle is indicated by a second-longitudinal-distance and a second-lateral-distance when the second-vehicle is initially detected, and the offset-distance is measured relative to a linearly-interpolated-line between two instances of the plurality of predetermined-lateral-distances characterized as closest to the second-longitudinal-distance and the second-lateral-distance.

3. The system in accordance with claim 1, wherein a heading of the second-vehicle is determined, an angle-difference of the heading is measured relative to a linearly-interpolated-line between two instances of the first-longitudinal-distances and the predetermined-lateral-distances characterized as closest to the second-longitudinal-distance and the second-lateral-distance, and the second-vehicle is characterized as not following the path-history when the angle-difference is greater than an angle-threshold.

4. The system in accordance with claim 1, wherein the controller is further configured to accumulate a plurality of second-longitudinal-distances of the second-vehicle at the plurality of predetermined-lateral-distances, and determine an averaged-path-history based on the plurality of first-longitudinal-distances and the plurality of second-longitudinal-distances at corresponding instances of the plurality of predetermined-lateral-distances.

* * * * *